(12) United States Patent
Griffiths

(10) Patent No.: US 9,617,923 B2
(45) Date of Patent: Apr. 11, 2017

(54) ENGINE FUEL CONTROL SYSTEM

(71) Applicant: ROLLS-ROYCE PLC, London (GB)

(72) Inventor: Michael Griffiths, Bromsgrove (GB)

(73) Assignee: ROLLS-ROYCE CONTROLS AND DATA SERVICES LIMITED, London (GB)

( * ) Notice: Subject to any disclaimer, the term of this patent is extended or adjusted under 35 U.S.C. 154(b) by 264 days.

(21) Appl. No.: 14/528,562

(22) Filed: Oct. 30, 2014

(65) Prior Publication Data

US 2015/0192075 A1 Jul. 9, 2015

(30) Foreign Application Priority Data

Jan. 3, 2014 (GB) .................................. 1400085.5

(51) Int. Cl.
*F02C 9/30* (2006.01)
*F02C 9/32* (2006.01)
*F01D 19/00* (2006.01)
*F02C 7/236* (2006.01)
*F02C 7/26* (2006.01)
*F02C 9/28* (2006.01)

(52) U.S. Cl.
CPC ................ *F02C 9/30* (2013.01); *F01D 19/00* (2013.01); *F02C 7/236* (2013.01); *F02C 7/26* (2013.01); *F02C 9/28* (2013.01); *F02C 9/32* (2013.01); *F05D 2220/323* (2013.01); *F05D 2260/85* (2013.01); *F05D 2270/03* (2013.01); *F05D 2270/07* (2013.01); *F05D 2270/304* (2013.01); *F05D 2270/56* (2013.01); *F05D 2270/64* (2013.01); *F05D 2270/66* (2013.01); *Y02T 50/671* (2013.01)

(58) Field of Classification Search
CPC ...... F02C 9/28; F02C 9/30; F02C 9/32; F02C 7/236; F02C 7/26; F01D 19/00
See application file for complete search history.

(56) References Cited

U.S. PATENT DOCUMENTS

| 4,062,185 | A | | 12/1977 | Snow | |
|---|---|---|---|---|---|
| 5,168,704 | A | * | 12/1992 | Kast | .......................... F02C 9/48 60/420 |
| 6,412,271 | B1 | * | 7/2002 | Maker | ...................... F02C 9/26 60/39.08 |
| 6,487,847 | B1 | * | 12/2002 | Snow | ..................... F02C 7/236 60/235 |
| 7,137,242 | B2 | | 11/2006 | Griffiths | |

(Continued)

*Primary Examiner* — Steven Sutherland
(74) *Attorney, Agent, or Firm* — Oliff PLC

(57) ABSTRACT

An engine fuel control system includes a fuel metering valve that controls the flow of fuel between supply and delivery lines which delivers fuel to engine burners. The fuel control system includes a fixed displacement main pump which receives fuel from a low pressure source and delivers the fuel at a first high pressure to the supply line, an augmenter pump which receives fuel from the low pressure source and delivers the fuel at a second high pressure to one or more fuel-pressure operated auxiliary engine devices, and a start valve which is actuated at low engine speeds to open a flow path which diverts fuel delivered by the augmenter pump away from the auxiliary engine devices to the supply line to augment the fuel delivered thereto by the main pump, the start valve being actuated at higher engine speeds to shut the flow path.

13 Claims, 5 Drawing Sheets

(56) References Cited

U.S. PATENT DOCUMENTS

| | | |
|---|---|---|
| 2007/0199301 A1 | 8/2007 | Shelby et al. |
| 2008/0236549 A1* | 10/2008 | Bickley .................. F02C 7/232 |
| | | 123/504 |
| 2010/0089025 A1 | 4/2010 | Baker |
| 2010/0089026 A1 | 4/2010 | Baker et al. |
| 2011/0162724 A1 | 7/2011 | Kleckler |
| 2011/0289925 A1 | 12/2011 | Dyer et al. |
| 2012/0234014 A1 | 9/2012 | Reuter et al. |
| 2012/0266600 A1 | 10/2012 | Bader et al. |

* cited by examiner

ENGINE FUEL CONTROL SYSTEM

FIELD OF THE INVENTION

The present invention relates to an engine fuel control system and in particular to a fuel control system for use in controlling the supply of fuel to a gas turbine engine.

BACKGROUND OF THE INVENTION

Fuel control systems, of the type described in U.S. Pat. No. 7,137,242, are used in controlling the supply of fuel to an aircraft engine. Such systems have a hydro-mechanical unit (HMU) which contains a metering valve and which receives a supply of fuel at high pressure (HP) from a gear pump driven from, and thus operated at a speed related to, the main shaft of the associated gas turbine engine. The inlet of the gear pump is supplied from a fuel reservoir by means of a boost pump or lift pump, the pressure at the inlet of the gear pump being defined as low pressure (LP), which in practice may be above atmospheric pressure but substantially below HP. The supply line from the outlet of the gear pump contains a fuel filter and enters the HMU to provide an HP supply to the inlet gallery of the metering valve and thence to a variable metering orifice of the valve. As is conventional in metering valves, a spool of the valve is moved within the housing of the valve to control the degree of opening of the metering orifice of the valve and thus the metering of fuel flow through the valve. A delivery line from the metering valve conducts metered fuel through a pressure raising and shut-off valve (PRSOV) of the HMU. The PRSOV serves, in use, to maintain a minimum fuel pump pressure rise (HP-LP), so as to ensure that internal HMU valves and any fuel-pressure operated auxiliary devices (such as variable stator vane actuators, variable inlet guide vane actuators and bleed valve actuators) arranged to receive fuel under pressure from the fuel control system can operate correctly. An output line from the PRSOV exits the HMU to pass the metered fuel to the engine burner manifold(s).

As performance demands on engines increase, the loads exerted on fuel-pressure operated auxiliary devices are also increasing. More particularly, one option for adapting fuel control systems to meet future higher load requirements is to use larger actuators and larger servo-valves in conjunction with a higher minimum pump pressure rise (HP-LP). However, the use of larger actuators and servo-valves may be limited by space constraints. In addition, raising the minimum pump pressure rise (HP-LP) increases heat input to the fuel and increases the risk of damage to the pump bearings, which have to run on thinner bearing film thicknesses at high pressure, low speed conditions. Thus there is a need to improve engine fuel control systems such that fuel is supplied at adequate flow rates and pressures to auxiliary devices. There is also a need to maintain or improve fuel control system efficiencies because of their impact on overall engine efficiencies.

SUMMARY OF THE INVENTION

In general terms, the present invention proposes an engine fuel control system having a main pump and a separate augmenter pump, which can run at a high pressure rise.

In a first aspect, the present invention provides an engine fuel control system including:

a fuel metering valve operable to control the flow of fuel between a supply line and a delivery line which delivers fuel to burners of the engine;

a fixed displacement main pump which receives fuel from a low pressure source and delivers the fuel at a first high pressure to the supply line;

an augmenter pump which receives fuel from the low pressure source and delivers the fuel at a second high pressure to one or more fuel-pressure operated auxiliary engine devices; and a start valve which is actuated at low engine speeds to open a flow path which diverts fuel delivered by the augmenter pump away from the auxiliary engine devices to the supply line to augment the fuel delivered thereto by the main pump, the start valve being actuated at higher engine speeds to shut the flow path.

Advantageously, by providing the augmenter pump, adequate fuel flow and pressure to the auxiliary engine devices can be ensured. However, the start valve, by diverting fuel to the supply line to augment the fuel delivered thereto by the main pump at low engine speeds (such as at engine start up), allows the size of the main pump to be reduced, providing benefits in terms of decreased main pump weight and heat rejection. In particular, at engine start conditions, the main pump speed is generally low (e.g. proportional to high pressure shaft speed) and since pump delivery flow is proportional to speed, it follows that the total pump delivery flow is low. Thus, it is advantageous to add the augmenter pump flow to the main pump flow in order to increase the flow available to light the engine; this is possible as it is usually unnecessary to operate the auxiliary engine devices at start. At the higher engine speeds associated with normal engine operation (such as idle and cruise), engine/pump speeds are much higher and the main engine pump has significant surplus capacity to meet the engine burner flow requirement even though this has increased above the values needed at start. At such conditions, the main pump can provide the total flow to the burners and the augmenter pump can provide the flow to operate the auxiliary engine devices, which are required to move at these conditions. Thus the controlled fuel diversion to the supply line is compatible with typical engine operation.

A further advantage of opening the flow path from the augmenter pump through the start valve to the supply line at low engine speeds is that it allows the augmenter pump to be de-pressurised at these speeds, which can help to ensure pump bearing integrity. This can be particularly beneficial if the augmenter pump relies on film lubrication.

In a second aspect, the present invention provides a gas turbine engine (e.g. an aero-engine) having the engine fuel control system of the first aspect.

Optional features of the invention will now be set out. These are applicable singly or in any combination with any aspect of the invention.

At the low engine speeds the flow path may divert substantially all of the fuel delivered by the augmenter pump to the supply line.

Conveniently, the start valve may be actuated by a change in pressure of the fuel received from the low pressure source, the pressure of the fuel received from the low pressure source being a function of engine speed. For example, when the pressure of the fuel received from the low pressure source increases (at high engine speeds), the start valve can be actuated to shut the flow path, and when the pressure of the fuel received from the low pressure source decreases (at low engine speeds), the start valve can be actuated to open the flow path.

The low pressure source may be a low pressure pump, such as a boost or lift pump.

At the higher engine speeds, a portion of the fuel delivered by the augmenter pump may be spilled away from the auxiliary engine devices to the supply line to augment the fuel delivered thereto by the main pump.

The augmenter pump may be a variable displacement pump, such as an axial piston pump, the fuel delivery flow rate of the augmenter pump being varied to compensate for fuel flow demands imposed by the auxiliary engine devices. Advantageously, when the start valve is shut, such a pump can be controlled to deliver only as much flow as is required by the auxiliary engine devices, thereby improving the thermal efficiency of the system. At engine start up, however, when the start valve is open, the variable displacement pump can be controlled to provide its maximum flow rate to the metering valve supply line, relieving the load on the main pump.

When the augmenter pump is a variable displacement pump, it may have a servo-controller to vary its pump flow rate. The engine fuel control system can then further include a pressure drop control valve which senses a pressure differential across the augmenter pump, the pressure drop control valve being arranged to control the servo-controller such that the pump flow rate of the augmenter pump is varied to maintain the augmenter pump pressure differential at a predetermined level. In this way, an adequate fuel pressure to operate the auxiliary engine devices can be ensured.

At the low engine speeds, the pressure drop control valve may be arranged to control the servo-controller such that the pump flow rate of the augmenter pump is a constant maximum rate at a given speed. That is, when the start valve is open and the pressure drop control valve closes, the servo-controller can move to fully stroke the augmenter pump, maximising its output for a given speed. In this way, the flow available to light the engine at engine start up when the engine speed is low can be maximised.

At the higher engine speeds, the pressure drop control valve may be configured to spill a portion of the fuel delivered by the augmenter pump away from the auxiliary engine devices to the supply line to augment the fuel delivered thereto by the main pump. For example, the amount of fuel spilled by the pressure drop control valve may change in inverse relation to variations in the pump delivery flow rate of the augmenter pump. The spill flow generally changes faster than the pump delivery flow rate can change because the pressure drop control valve responds before the servo-controller, and thus the spill flow variation can act as a lead term which has an immediate effect on the fuel flow delivered to the auxiliary engine devices. The spill flow at higher engine speeds is particularly advantageous in combination with the start valve flow path diversion at low engine speeds as the augmenter pump can then augment the main pump at two key sizing points for the main pump: start and take off.

When, at the higher engine speeds, the difference between the first high pressure and the second high pressure reduces to less than a predetermined amount, the pressure drop control valve may be arranged to control the servo-controller such that the pump flow rate of the augmenter pump is a constant maximum rate for a given speed. For example, high burner flow conditions, such as take off, can raise the engine speed to such an extent that the consequent increase in the first high pressure reduces the difference between the first and second high pressures to less than the predetermined value. In this way, the system can maximise the flow to the engine at high burner flow conditions. More particularly, at high burner flow conditions, the main pump pressure rise (HP-LP) can rise above the level that the pressure drop control valve is trying to control the augmenter pump pressure rise (HPa-LP) to. Under these circumstances, the pressure drop control valve may open fully so that the servo-controller fully strokes the augmenter pump, maximising the flow available to augment the main pump delivery flow whilst maintaining a high level of (HPa-LP) for control of the auxiliary engine devices.

As an alternative to a variable displacement pump, the augmenter pump may be a fixed displacement pump (such as a gear pump). In this case, the engine fuel control system may further include a pressure drop control valve which senses a pressure differential across the augmenter pump, the pressure drop control valve being configured to spill a variable amount of the fuel delivered by the augmenter pump away from the auxiliary engine devices to the supply line to augment the fuel delivered thereto by the main pump and to maintain the augmenter pump pressure differential at a predetermined level. Thus variation in the spill flow can be the primary method by which the pressure of fuel delivered to the auxiliary engine devices can be controlled.

The fixed displacement main pump may be a single gear pump. Another option, however, is for the fixed displacement main pump to be a dual gear pump.

The one or more auxiliary engine devices can include any kind of actuator, and in particular can include any one or more of: a variable stator vane actuator, variable inlet guide vane actuator and a bleed valve actuator.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
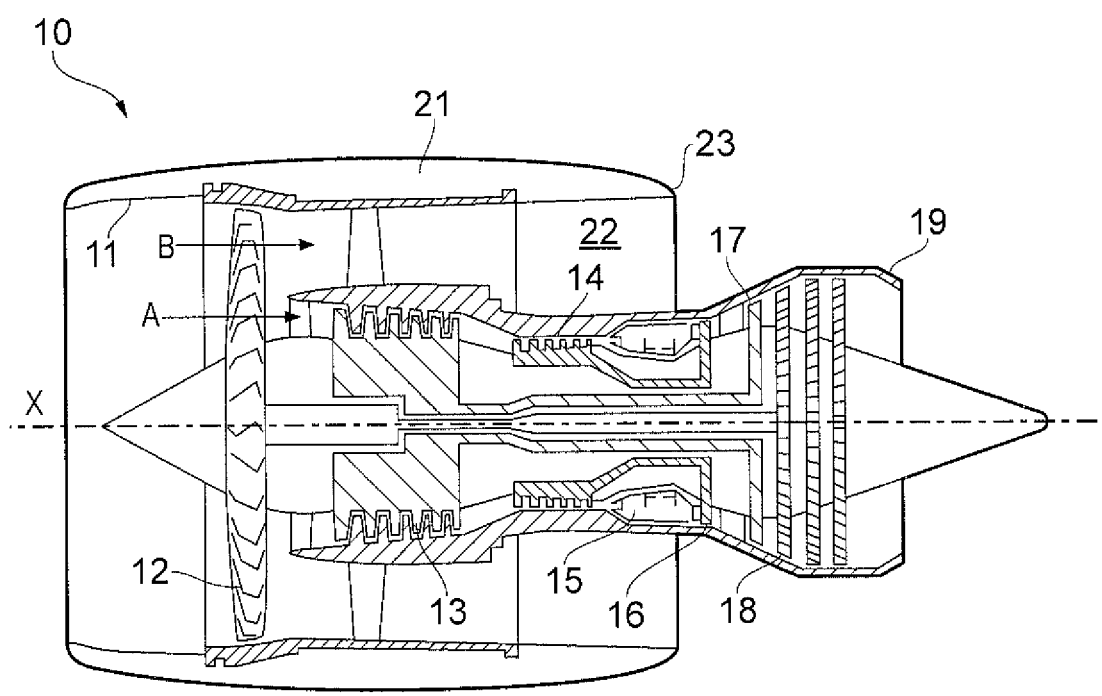
FIG. 1 shows a longitudinal cross-section through a gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
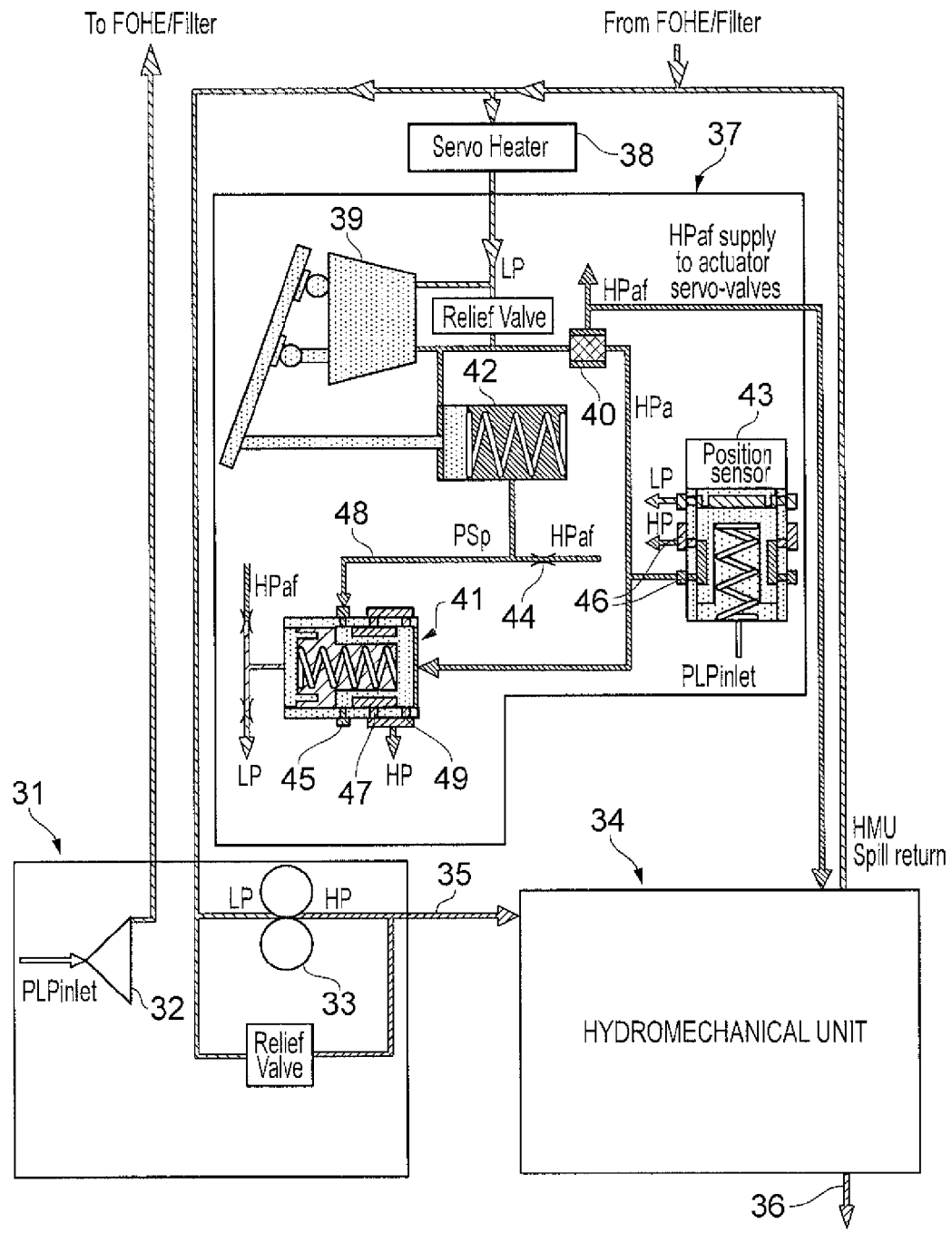
FIG. 2 illustrates a fuel control system for the engine of FIG. 1 during engine start.

A fuel control system of the engine, which is illustrated diagrammatically in FIG. 2, has a main pump unit 31 comprising a low pressure (LP), pump 32 which draws fuel from a fuel tank of the aircraft at pressure PLPinlet and supplies the fuel at boosted pressure LP to the inlet of a high pressure (HP) fixed displacement pump 33. The LP pump 32 typically comprises a centrifugal impeller pump while the HP pump 33 may comprise one or more twin pinion gear pumps.

The LP and HP pumps 32, 33 are typically connected to a common drive input, which is driven by the engine HP shaft via an engine accessory gearbox. The inter-stage flow between the LP and HP pumping stages is typically used to cool engine lubrication oil in a fuel/oil heat exchanger (FOHE—not shown).

Not all the HP fuel exiting the HP pump 33 may be burnt in the engine. A substantial proportion may be recirculated back to the pump unit 31 via a spill return of the hydromechanical unit 34 (described below). For example, when the engine is operating at altitude where the engine burns little fuel, there may be significant fuel recirculation, raising the temperature of the fuel in the pumping system.

A hydro-mechanical unit (HMU) 34 of the fuel control system for the engine is also illustrated diagrammatically in FIG. 2. The HP pump 33 feeds HP fuel to a supply fine 35 which extends to a fuel metering valve (not shown) of the HMU, the metering valve being operable to control the rate at which fuel is allowed to flow from the supply line 35 via a pressure raising and shut-off valve (not shown) of the HMU to a delivery line 36 and thence to burners of the engine. Servo-valve offtake flows (not shown) may be taken via a flow washed filter (not shown) which can be provided on the supply line 35. The HP pump 33 has a relief valve which prevents excess pressure build up in the supply line 35 in the event of a downstream blockage e.g. caused by coking of fuel in the engine fuel manifold.

The fuel control system also has an actuator pump unit 37 which receives a portion of the LP fuel from the FOHE mixed with fuel from a spill return of the HMU 34. The fuel enters the actuator pump unit 37 via an optional servo heater 38, The actuator pump unit 37 contains a variable displacement (e.g. axial piston) pump 39 which pressurises the LP fuel entering the unit 37 to a high pressure HPa. The pressurised fuel is filtered via a flow washed filter 40, and delivered at a pressure HPaf to fuel-pressure operated auxiliary engine devices (not shown), such as actuator servo-valves for variable stator vanes, variable inlet guide vanes and bleed valves. These may be located in the HMU 34 or in a separate actuator control block. Thereafter the fuel is sent to the HMU spill return. The variable displacement pump (VDP) 39 also has a relief valve which prevents excess pressure build up in the supply line 35 in the event of a downstream blockage.

A pressure drop control valve (PDCV) 41 senses the pressure differential (HPa-LP) across the VDP 39 and is arranged to control a servo-controller 42 of the VDP 39 such that the pump flow rate of the VDP is varied to maintain the pressure differential at a predetermined level. For example, the servo-controller may have a piston and cylinder arrangement, with the position of the piston in the cylinder changing the angle of a swash plate of the VDP 39 to vary the pump flow rate. A biasing spring in the cylinder biases the piston to a position which increases the pumped flow rate. To a first side of the piston, the cylinder is at the delivery pressure HPa of the VDP 39. To the second side of the piston, the cylinder is in fluid communication with fuel at pressure PSp via a servo orifice 44. The cylinder to the second side of the piston is also in fluid communication with a pressure drop control orifice (PDO) 45 of the PDCV 41 via a connection line 48. The pressure PSp in the cylinder to the second side of the piston is thus determined by HPaf and the state of the PDO 45, which is in turn determined by the sensed pressure differential (HPa-LP) of the PDCV 41. In the start case when the PDO 45 is closed, shown in FIG. 2, the pressure PSp rises to HPaf. Decreasing HPa-PSp causes the VDP 39 to increase its pumped flow rate, while increasing HPa-PSp causes the VDP 39 to decrease its pumped flow rate.

The actuator pump unit 37 allows the VDP 39 to combine with the HP pump 33 to deliver fuel to the metering valve supply line 35. In particular, a start valve 43 is connected to the HPa fuel line from the VDP 39.

The start valve 43 senses the pressure differential (LP-PLPinlet) across the LP pump 32. At low engine speeds (e.g. 6-30%), this differential, which is typically proportional to (engine speed)$^2$, is low, setting the start valve in a position (uppermost as drawn in FIG. 2) in which ports 46 in the valve connect the VDP 39 delivery (at HPa) to the HP pump 33 outlet. In this way, substantially all of the fuel delivered by the VDP 39 can be sent to the metering valve supply line 35. The start valve 43 can have a position sensor to inform the engine's electronic controller of the valve's position.

At the same time, the VDP 39 pressure rise (HPa-LP) is low (for example much less than 1000 psid (6.9 MPa)), causing the valve piston of the PDCV 41 to fully close the PDO 45 (by movement of the valve piston to the right as shown in FIG. 2). As a result no flow leaves the cylinder of the pump servo-controller 42 via the PDO 45, HPa-PSp falls to a low value, and the piston of the servo-controller fully strokes the VDP 39 maximising its pumped flow rate In summary, at start the VDP 39 is fully stroked, operating like a fixed displacement pump. The start valve 43 opens a flow path that allows almost all the VDP 39 delivery flow (except for leakage to the servo-valves) to pass to the fuel metering valve supply line 35 at HP, augmenting the flow from the HP pump 33 and thereby reducing the size of the flow required from this pump. A further advantage of this arrangement is that it allows the VDP 39 to be de-pressurised at start, which reduces bearing wear in the VDP (e.g. in the cylinders and at the swash plate) and as a result reduces leakages.

Figure 3:
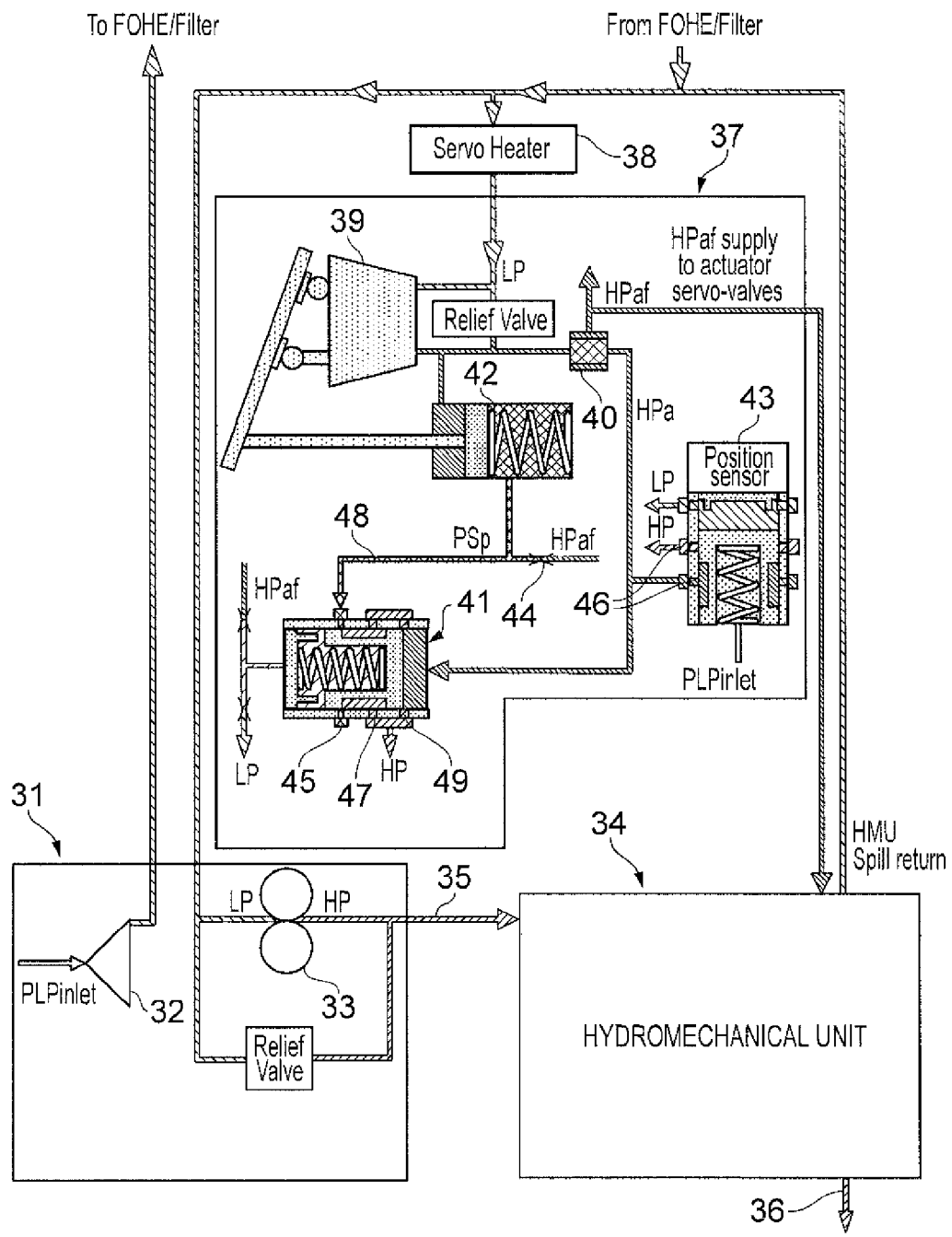
FIG. 3 illustrates the fuel control system of FIG. 2 during normal engine operation.

FIG. 3 shows the fuel control system of FIG. 2 during normal operation at relatively low burner flows, e.g. engine speeds of greater than 60%. At such speeds, the LP pump 32 pressure rise LP-PLPinlet increases significantly, causing the piston of the start valve 43 to travel to a position (lowermost in FIG. 3) which closes off the connection ports 46 between the VDP 39 delivery to the HP pump 33 outlet.

At idle/cruise type conditions, the PDCV 41 senses the VDP 39 pressure rise (HPa-LP) and sets it to a predetermined level (e.g. 1000 psid (6.9 MPa)) required for actuation control. HPa-PSp is substantially constant, set by the sizing of the piston of the servo-controller 42 and its associated spring. if an engine demand increases flow to the actuators via the actuator controlling servo-valves (these can be located in the HMU 34 or in a separate block) or other controlling devices, HPa-LP falls, causing the valve piston of the PDCV 41 to move (rightwards in FIG. 3) to close the PDO 45. As a result, flow into the cylinder of the servo-controller 42 via the servo orifice 44 exceeds the flow exiting the cylinder via the PDO 45, displacing the piston in the servo-controller 42 to upstroke the VDP 39 until HPa-LP is restored to the predetermined level. However, if the actuators require less flow, HPa-LP increases to open the PDO 45, resulting in a spill of fuel from the connection line 48 through the PDO 45 and a large port 47 of the PDCV 41 to the HP pump 33 outlet. This results in the flow leaving the cylinder of the servo-controller 42 via the PDO 45 exceeding the flow entering the cylinder via the servo orifice 44, displacing the piston in the servo controller 42 to de-stroke the VDP 39 and restore HPa-LP.

The PDCV 41 also includes a spill port 49 which connects the VDP 39 delivery at pressure HPa to the HP pump 33 outlet at pressure HP (at low flow conditions HPa-HP may be around 800 psid (5.5 MPa)). This arrangement provides rapid transient response. In particular, if the actuators require more actuation flow, as soon as the PDCV 41 moves to close the PDO 45, the amount of spill flow through the spill port 49 is reduced and this is immediately available to drive the actuators before the VDP 39 has had time to upstroke. Conversely, if the actuators require less actuation flow, as soon as the PDCV 41 moves to open the PDO 45, the amount of spill flow through the spill port 49 is increased before the VDP 39 has had time to downstroke. Thus the spill flow from the VDP 39 delivery through the spill port 49 acts as a lead term, which is also supplemented by the flow displaced by the valve piston of the PDCV 41 as it moves.

In summary, during normal operation at low fuel flows, the VDP 39 runs at a predetermined pressure differential and delivers flow only as required for actuation control. This is thermally efficient. In addition, it allows the HP pump 33 to run at a low pressure differential (as there is no requirement for the pump 33 to provide a fuel supply to move actuators), which is also thermally efficient.

Figure 4:
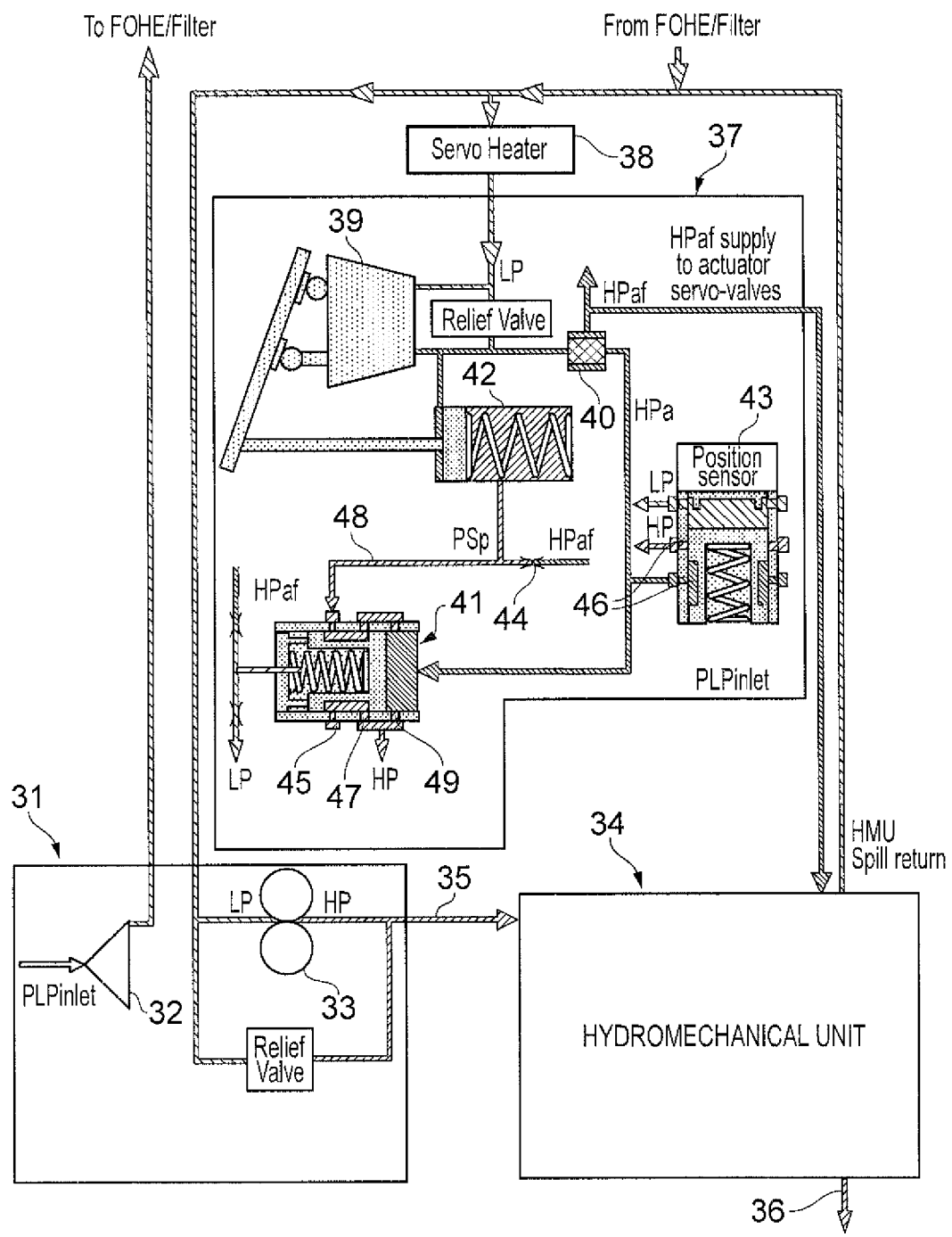
FIG. 4 illustrates the fuel control system of FIG. 2 during take-off.

FIG. 4 shows the fuel control system of FIG. 2 at high flow conditions such as at take-off. Under these conditions, the pressure raising and shut-off valve in the HMU reaches its maximum stop and the fuel pressure HP in the supply line 35 increases significantly. The pressure drop available to de-stroke the pump via the servo-controller 42 is HPa-HP. As burner flow increases towards take off levels, this pressure drop progressively decreases and consequently, the capability to de-stroke the VDP 39 decreases. Once HP approaches HPa and exceeds PSp, flow enters the cylinder of the pump servo-controller 42 via both the servo orifice 44 and the PDO 45, displacing the piston of the servo-controller 42 to fully stroke the VDP 39. Effective control of the pressure differential HPa-LP across the VDP 39 (i.e. the actuation pressure differential) is thus lost. In the limit, with the PDCV 41 at its maximum travel stop, HPa-HP is set by the maximum flow from the VDP 39 passing through the PDCV spill port 49. This pressure drop is low and acts across the servo orifice 44 and the PDO 45 to set a low value of HPa-PSp which is insufficient to overcome the spring of the servo-controller 42 so that the VDP 39 remains fully stroked.

In summary, at high burner flow conditions HP rises and control of the VDP 39 pressure differential (HPa-LP) is lost. However, as the differential always exceeds the normal predetermined level required for actuator control (say 1000 psid), there is no difficulty with providing actuator control.

The VDP 39 assumes its maximum stroke position and behaves like a fixed displacement pump. When the actuators are not moving, most of its delivery flow augments the flow from HP pump 33. This helps to reduce the size of the HP pump 33 required for maximum take-off flow. At lower take-off flows, the VDP 39 is still fully stroked and any excess "total" pump flow (i.e. HP pump 33+VDP 39) is spilt to LP via the spill valve in the HMU. This adds heat to the fuel but occurs at a condition where heat rejection is not a concern.

Figure 5:
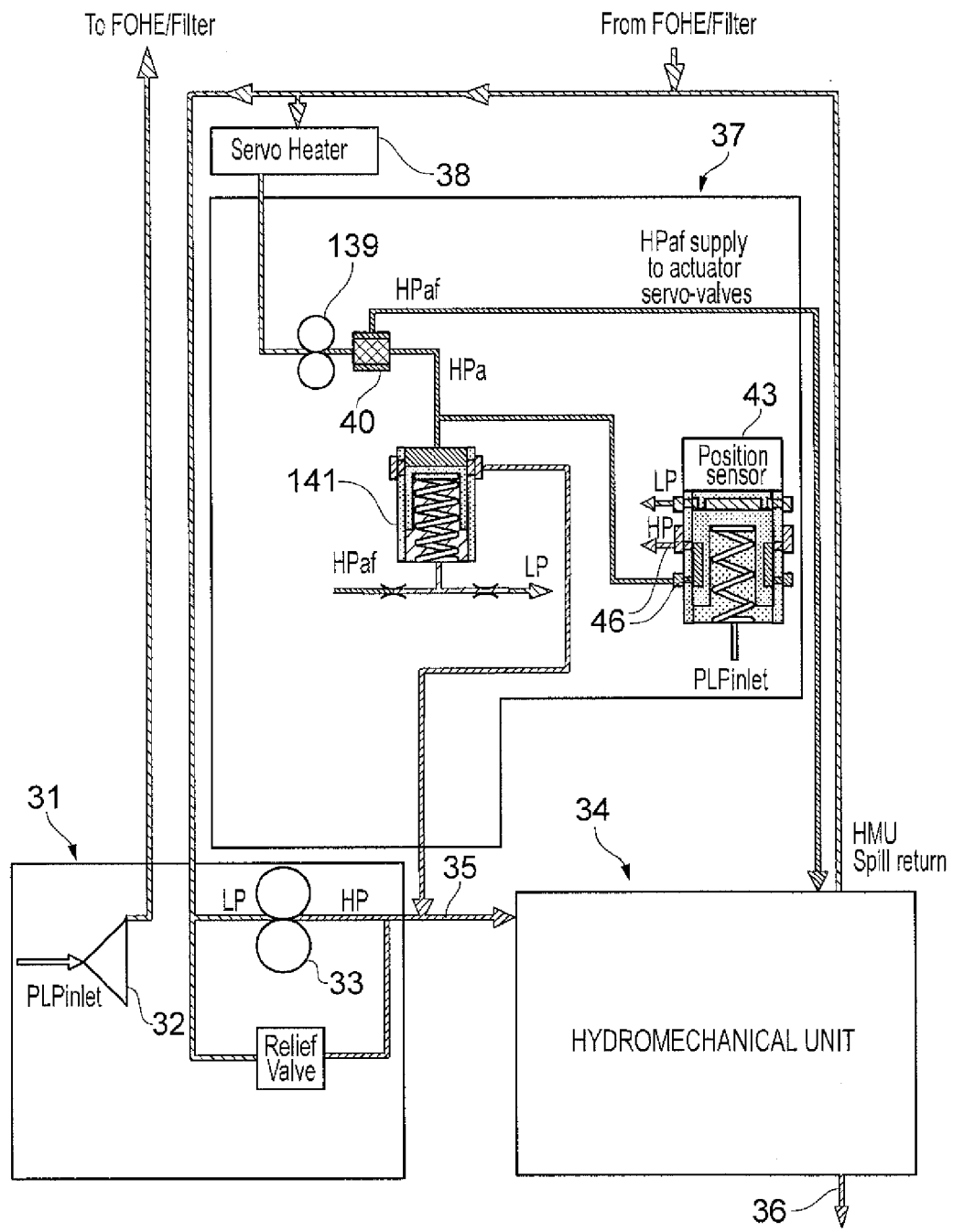
FIG. 5 illustrates an alternative fuel control system for the engine of FIG. 1 during engine start.

Advantageously, at start and take-off the VDP 39 acts as a fixed displacement pump while at other operation conditions it supplies less flow with resultant heat rejection benefits. However, alternative fuel control systems are possible in which, instead of a variable displacement pump, the actuator pump unit 37 has a fixed displacement pump, such as a piston pump or gear pump. FIG. 5 illustrates such an alternative fuel control system for the engine of FIG. 1. Corresponding features have the same reference numbers in FIG. 5 and FIGS. 2 to 4.

The actuator pump unit 37 in the system of FIG. 5 has a fixed gear pump 139 which pressurises the LP fuel entering the unit 37 to HPa. Like the system of FIGS. 2 to 4, the pressurised fuel is filtered via a flow washed filter 40 and delivered at a pressure HPaf to fuel-pressure operated auxiliary engine devices (not shown). Also like the system of FIGS. 2 to 4, a start valve 43 senses the pressure differential across the LP pump 32, and during engine start is set to a position (illustrated in FIG. 5) in which ports 46 in the valve connect the fixed gear pump 139 delivery (at HPa) to the HP pump 33 outlet.

The fixed gear pump 139 is coupled to a pressure drop control valve (PDCV) 141 which senses the pressure differential (HPa-LP) across the pump 139. At start conditions (low flow) the PDCV 141 is fully closed and the start valve 43 ports 46 are open, delivering augmenter flow from the pump 139 to the metering valve HP supply line 35. Under normal operation conditions the start valve 43 ports 46 are closed and some augmenter flow is passed to the auxiliary engine device actuator servo-valves and some is spilled through the PDCV 141 to the supply line 35. At take-off (high flow) the PDCV 141 is fully open, the start valve is closed and the augmenter flow passes through the PDCV 141 to the supply line 35.

Thus the actuator pump unit 37 of FIG. 5 provides similar functionality to that of the unit of FIGS. 2 to 4, except that under normal operation conditions more flow is spilled to the supply line 35 because the output from the fixed gear pump 139 cannot be reduced. Therefore, although the actuator pump unit 37 of FIG. 5 provides reduced heat rejection benefits, it nonetheless allows the HP pump 33 and to be reduced in size.

While the invention has been described in conjunction with the exemplary embodiments described above, many equivalent modifications and variations will be apparent to those skilled in the art when given this disclosure. For example, instead of a single HP pump 33, the system may have parallel dual HP pumps. Further, although the start valve 43 and the PDCV 41, 141 are shown as part of the actuator pump unit 37, they could be part of the HMU 34 or a part of a separate actuator control block. Accordingly, the exemplary embodiments of the invention set forth above are considered to be illustrative and not limiting. Various changes to the described embodiments may be made without departing from the spirit and scope of the invention.

The invention claimed is:

1. An engine fuel control system including:
    a fuel metering valve operable to control a flow of fuel between a supply line and a delivery line which delivers fuel to burners of an engine;
    a fixed displacement main pump configured to receive fuel from a low pressure source and deliver the fuel at a first high pressure to the supply line;
    a variable displacement augmenter pump which is configured to receive fuel from the low pressure source and deliver the fuel at a second high pressure to one or more fuel-pressure operated auxiliary engine devices, the variable displacement augmenter pump being configured to provide a fuel delivery flow rate which is variable to compensate for fuel flow demands imposed by the one or more fuel-pressure operated auxiliary engine devices; and
    a start valve which is configured to be actuated at low engine speeds to open a flow path which diverts fuel delivered by the variable displacement augmenter pump away from the one or more fuel-pressure operated auxiliary engine devices to the supply line to augment the fuel delivered thereto by the fixed displacement main pump, the start valve being configured to be actuated at higher engine speeds to shut the flow path;
    wherein the variable displacement augmenter pump has a servo-controller configured to vary its pump flow rate; and
    wherein the engine fuel control system further includes a pressure drop control valve which is configured to sense a pressure differential across the variable displacement augmenter pump, the pressure drop control valve being arranged to control the servo-controller such that the pump flow rate of the variable displacement augmenter pump is varied to maintain a pressure differential across the variable displacement augmenter pump at a predetermined level, and being configured to spill, at the higher engine speeds, a portion of the fuel delivered by the variable displacement augmenter pump away from the one or more fuel-pressure operated auxiliary engine devices to the supply line to augment the fuel delivered thereto by the fixed displacement main pump.

2. The engine fuel control system according to claim 1, wherein at the low engine speeds the flow path diverts all of the fuel delivered by the variable displacement augmenter pump to the supply line.

3. The engine fuel control system according to claim 1, wherein the start valve is configured to be actuated by a change in pressure of the fuel received from the low pressure source, the pressure of the fuel received from the low pressure source being a function of engine speed.

4. The engine fuel control system according to claim 1, wherein the low pressure source is a low pressure pump.

5. The engine fuel control system according to claim 1, wherein at the low engine speeds, the pressure drop control valve is arranged to control the servo-controller such that the pump flow rate of the variable displacement augmenter pump is a constant maximum rate for a given speed.

6. The engine fuel control system according to claim 1, wherein, at the higher engine speeds, the pressure drop control valve is configured to spill a portion of the fuel delivered by the variable displacement augmenter pump away from the one or more fuel-pressure operated auxiliary engine devices to the supply line to augment the fuel delivered thereto by the fixed displacement main pump.

7. The engine fuel control system according to claim 6, wherein an amount of fuel spilled by the pressure drop control valve changes in inverse relation to variations in the pump flow rate of the variable displacement augmenter pump.

8. The engine fuel control system according to claim 1, wherein when, at the higher engine speeds, the difference between the first high pressure and the second high pressure reduces to less than a predetermined amount, the pressure drop control valve is arranged to control the servo-controller such that the pump flow rate of the variable displacement augmenter pump is a constant maximum rate for a given speed.

9. The engine fuel control system according to claim 1, wherein the fixed displacement main pump is a single gear pump.

10. The engine fuel control system according to claim 1, wherein the fixed displacement main pump is a dual gear pump.

11. The engine fuel control system according to claim 1, wherein the one or more fuel-pressure operated auxiliary engine devices include any one or more of: a variable stator vane actuator, variable inlet guide vane actuator and a bleed valve actuator.

12. A gas turbine engine having the engine fuel control system according to claim 1.

13. An engine fuel control system including:
    a fuel metering valve operable to control a flow of fuel between a supply line and a delivery line which is configured to deliver fuel to burners of an engine;
    a fixed displacement main pump which is configured to receive fuel from a low pressure source and deliver the fuel at a first high pressure to the supply line;
    a fixed displacement augmenter pump that is configured to receive fuel from the low pressure source and deliver the fuel at a second high pressure to one or more fuel-pressure operated auxiliary engine devices, and
    a start valve which is configured to be actuated at low engine speeds to open a flow path which diverts fuel delivered by the fixed displacement augmenter pump away from the one or more fuel-pressure operated auxiliary engine devices to the supply line to augment the fuel delivered thereto by the fixed displacement main pump, the start valve being configured to be actuated at higher engine speeds to shut the flow path;
    wherein the engine fuel control system further includes a pressure drop control valve which is configured to sense a pressure differential across the fixed displacement augmenter pump, the pressure drop control valve being configured to spill, at the higher engine speeds, a variable amount of the fuel delivered by the fixed displacement augmenter pump away from the one or more fuel-pressure operated auxiliary engine devices to the supply line to augment the fuel delivered thereto by the fixed displacement main pump and to maintain a pressure differential across the fixed displacement augmenter pump at a predetermined level.

* * * * *